United States Patent
Li et al.

(10) Patent No.: US 12,072,608 B2
(45) Date of Patent: Aug. 27, 2024

(54) INFLATABLE LAMP

(71) Applicant: GUANGDONG SIRUI OPTICAL CO., LTD., Zhongshan (CN)

(72) Inventors: Jie Li, Zhongshan (CN); Zhangxuan Yang, Zhongshan (CN)

(73) Assignee: GUANGDONG SIRUI OPTICAL CO., LTD., Zhongshan (CN)

(*) Notice: Subject to any disclaimer, the term of this patent is extended or adjusted under 35 U.S.C. 154(b) by 0 days.

(21) Appl. No.: 18/204,400

(22) Filed: Jun. 1, 2023

(65) Prior Publication Data

US 2024/0176212 A1 May 30, 2024

(30) Foreign Application Priority Data

Nov. 25, 2022 (CN) .......................... 202223154189.9

(51) Int. Cl.
*F21V 3/02* (2006.01)
*F21V 17/06* (2006.01)
*F21V 23/00* (2015.01)
*G03B 15/05* (2021.01)
*F21Y 105/16* (2016.01)

(52) U.S. Cl.
CPC .............. *G03B 15/05* (2013.01); *F21V 3/026* (2013.01); *F21V 17/06* (2013.01); *F21V 23/008* (2013.01); *F21Y 2105/16* (2016.08); *G03B 2215/0592* (2013.01)

(58) Field of Classification Search
CPC ........ F21V 3/026; F21V 17/06; F21V 23/008; F21Y 2105/16; G03B 15/05; G03B 2215/0592
See application file for complete search history.

(56) References Cited

U.S. PATENT DOCUMENTS

| | | | |
|---|---|---|---|
| 8,613,527 B1* | 12/2013 | Allen ...................... | F21V 3/026 362/234 |
| 2007/0019403 A1* | 1/2007 | Boghossian ............. | F21V 3/023 362/157 |
| 2008/0175005 A1* | 7/2008 | Kellmann ............... | F21S 9/037 362/352 |
| 2008/0175006 A1* | 7/2008 | Kellmann ............... | F21V 3/023 362/363 |
| 2021/0317978 A1* | 10/2021 | Girolami ................ | F21V 21/116 |
| 2023/0008449 A1* | 1/2023 | Chun ........................ | F21V 1/14 |

FOREIGN PATENT DOCUMENTS

| | | | | |
|---|---|---|---|---|
| WO | WO 2010/094794 | * | 8/2010 | ............. F21V 17/20 |
| WO | WO 2020/116049 | * | 6/2020 | ............. F21V 21/40 |
| WO | WO 2022106109 | * | 5/2022 | ............. H05B 45/30 |

OTHER PUBLICATIONS

English Machine Translation of WO 2022106109 provided by Espacenet (Year: 2022).*

* cited by examiner

*Primary Examiner* — Zheng Song
(74) *Attorney, Agent, or Firm* — Loeb & Loeb LLP

(57) ABSTRACT

Present invention discloses an inflatable lamp, which comprises an inflatable assembly and a lamp body assembly. The inflatable assembly is provided with a frame structure, and the frame structure is used for filling air. The lamp body assembly is located at the bottom of the frame structure, and the light emitted by the lamp body assembly can be emitted from the middle of the frame structure.

16 Claims, 3 Drawing Sheets

INFLATABLE LAMP

CROSS-REFERENCE TO RELATED APPLICATION

This application claims priority to a Chinese patent application number 2022231541899, filed on Nov. 25, 2022, whose disclosure is incorporated by reference in its entirety herein.

TECHNICAL FIELD

The present invention disclosure relates to lighting equipment technology. In particular, the invention disclosure is related to an inflatable lamp.

BACKGROUND

Lamps are not limited to illuminating objects only, but have been used in visual works and professional photography, such as to enhance lighting and shadow and to bring focus to the main individual and object in order to achieve the best photographic effect. This type of lamps is often referred to as photographic lamps.

In existing technology, some photographic lights or lamps are made in the form of inflatable lamps for ease of transportation or carrying, and inflatable lamps can be folded and stored in the uninflated state, thus reducing storage and increasing portability. The lighting source of the lamps is disposed in the interior of the inflatable lamp, that is in the void or empty space between two front covers. However, to reduce or prevent the possibility of air leakage, the material of the existing pouch is unavoidably thick. This fact would weaken the light emitted by the lamp source, resulting in the waste and inefficiency of the lighting and increase light distortion.

SUMMARY

Aspects of the present invention aim to solve at least one of the technical problems existing in the prior art. In one aspect, the utility model of the present invention proposes an inflatable lamp, which can effectively save photoelectric resources.

According to one embodiment of the invention, an inflatable lamp comprises an inflatable assembly and a lamp body assembly. The inflatable assembly is provided with a frame structure, and the frame structure is used to fill the gas or air. The lamp body assembly is located at the bottom or back of the frame structure, and the light emitted by the lamp body assembly can be emitted from the middle of the frame structure.

An inflatable lamp according to an embodiment of the present invention includes at least the following beneficial effects:

In some aspects, the frame structure of embodiments of the inflatable lamp is filled with gas to achieve as a lampshade. In further aspects, when the lamp body assembly emits light from the middle of the frame structure, embodiments of the invention may effectively avoid the emitted light being distorted, thus improving the utilization rate of photoelectric resources. The utility model structure of embodiments of the invention provides elegant construction; it is easy to use; and has good practical value.

According to some embodiments of the present invention, the inflatable assembly comprises a fabric cover and an air bag or pouch disposed in the cover.

According to some embodiments of the present invention, the fabric cover is provided with a zipper on the side.

According to some embodiments of the present invention, the lamp body assembly is provided with a support or bracket assembly on one side away from the inflatable assembly.

According to some embodiments of the present invention, the bracket assembly and the lamp body assembly are detachable.

According to some embodiments of the present invention, the lamp body assembly is provided with a magnet cover plate corresponding to the installation position of the inflatable assembly, and the top of the bracket assembly is provided with a metal plate adapted to the magnet cover plate.

According to some embodiments of the present invention, the magnet cover plate is provided with a limit hole, and the bracket assembly is provided with a snap structure adapted to the limit hole.

According to some embodiments of the present invention, the inflatable lamp further comprises a control, the control is electrically connected to the lamp body assembly, the control is used to supply power to the lamp body assembly and actuate the light of the lamp body assembly.

According to some embodiments of the present invention, the inflatable assembly is provided with an air pump nozzle assembly, and the air pump nozzle assembly is electrically connected to the control.

According to some embodiments of the present invention, the frame structure is provided with a soft cloth in the direction of light illumination of the lamp body assembly.

Additional aspects and advantages of the present invention may be given in part in the description below, and some will become apparent from the description below, or learned through the practice of the present invention.

BRIEF DESCRIPTION OF THE DRAWINGS

The present invention is further described below in conjunction with the accompanying drawings and embodiments, wherein.

LISTING OF REFERENCE NUMBERS AND THEIR CORRESPONDING REFERENCE PARTS

Figure 1:
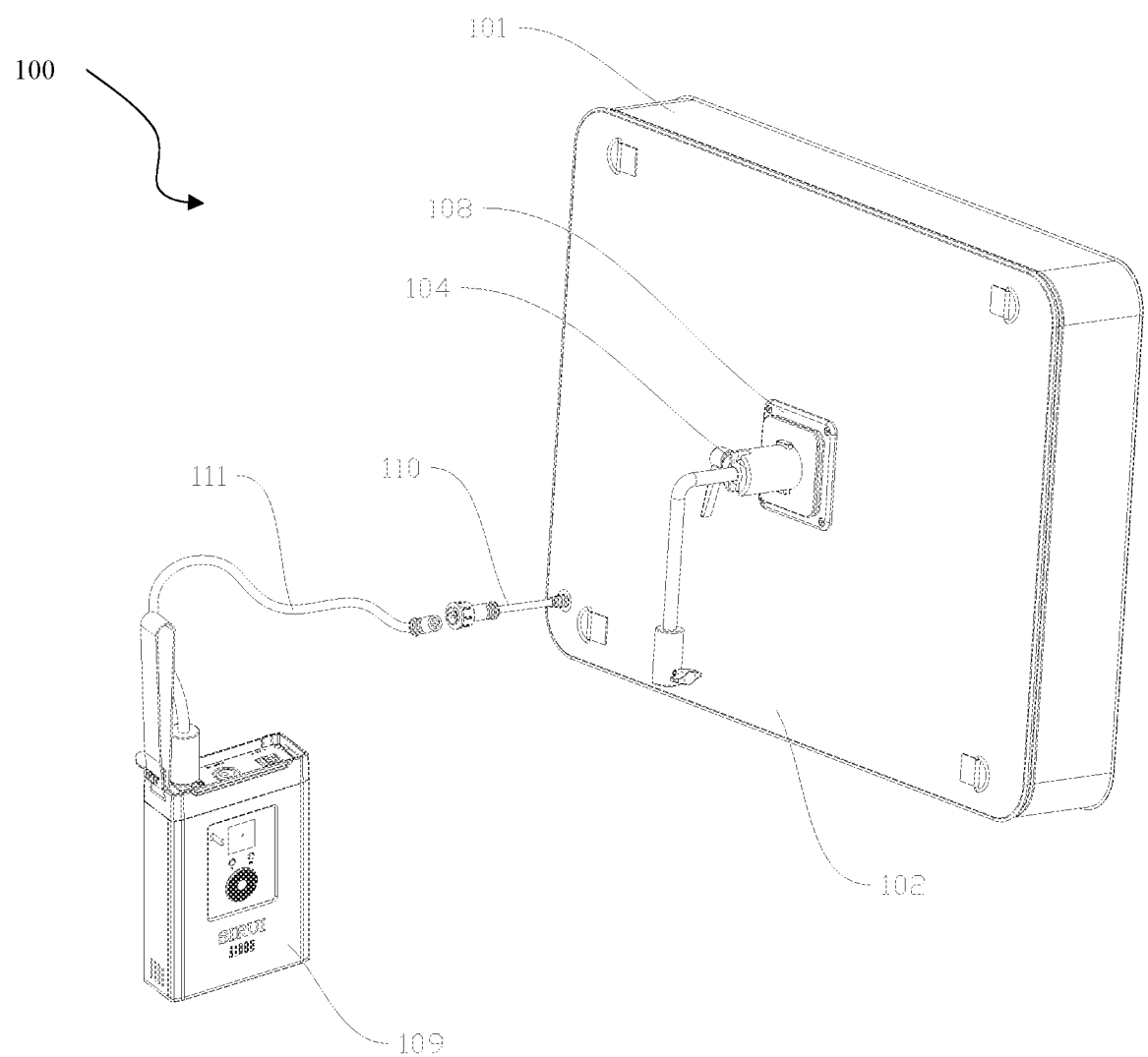
FIG. 1 is a schematic diagram of the overall structure of an inflatable lamp of an embodiment of the present invention.

100: inflatable lamp; 101: Inflatable assembly; 102: Lamp body assembly; 103: frame structure; 104: Bracket assembly; 105: mounting plate; 106: bendable connection; 107: Pipe connection; 108: magnet cover; 109: Control unit; 110: M16 male connection; 111: M16 female connection; 112: Air pump nozzle assembly; 113: diffuser; 114: fabric cover; and 115 zipper.

DETAILED DESCRIPTION

Embodiments of the present invention are described in detail below, examples of which are shown in the drawings, where the same or similar reference numerals represent the same or similar elements or elements having the same or similar functions throughout. The embodiments described below with reference to the accompanying drawings are exemplary and are only used to explain the present utility model, but should not be construed as limiting the present utility model.

In the description of the present utility model of aspects of the invention, it should be understood that when it comes to orientation descriptions, for example, the orientation or positional relationship indicated by up, down, etc., is based on the orientation or positional relationship shown in the drawings, and is only for the convenience of describing the utility model of embodiments of the invention and exemplary descriptions do not indicate or imply that the device or element referred to must have a specific orientation, be constructed and operate in a specific orientation, and thus should not be construed as limiting the invention.

In the description of the present utility model of aspects of the invention, a plurality refers to more than two. If the description of the first and second is only for the purpose of distinguishing the technical features, it cannot be understood as indicating or implying the relative importance or implicitly indicating the number of the indicated technical features or implicitly indicating the order of the indicated technical features relation.

In the description of the utility model of aspects of the invention, unless otherwise clearly defined, words such as setting, installation, and connection should be understood in a broad sense, and those skilled in the art can reasonably determine the specific meanings of the above-mentioned words in the utility model in combination with the specific content of the technical solution.

Figure 2:
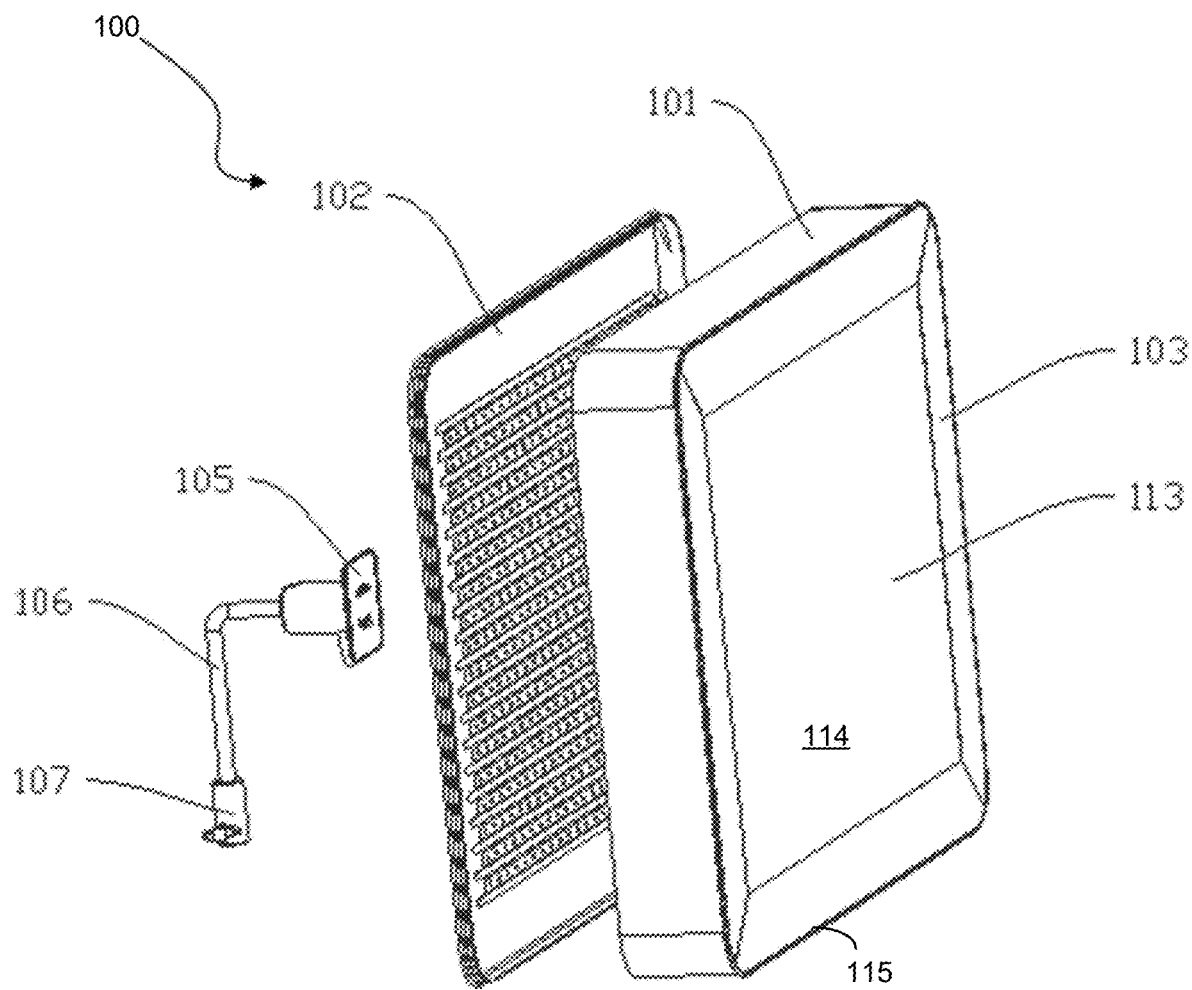
FIG. 2 is an explosion view of the lamp body assembly of an inflatable lamp of an embodiment of the present invention.
Figure 3:
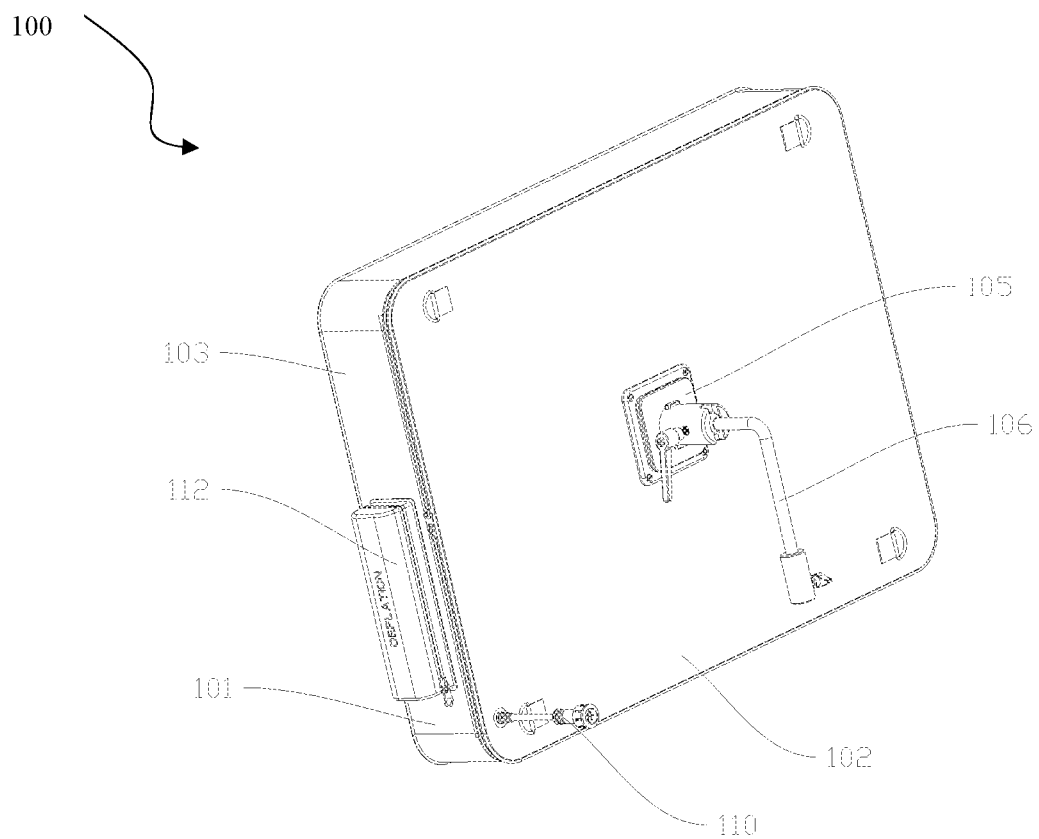
FIG. 3 is a perspective view of an inflatable lamp of an embodiment of the present invention.

Referring to FIGS. 1 to 3, an inflatable lamp 100 according to an embodiment of the present invention may include an inflatable assembly 101 and a lamp body assembly 102. The inflatable assembly 101 may further disposed within a frame structure 103 and a fabric casing or cover 114. For example, the frame structure 103 may provide a void so that the inflatable assembly 101 may be disposed therein. As the frame structure 103 provides a three-dimensional (3D) frame, such as the with 4 relatively small height or thickness sides of the inflatable lamp 100. In one aspect, the frame structure 103 may be covered by the fabric casing or cover 114 so that the inflatable assembly 101 may be hidden visibly so that a user may only see the frame structure 103. In another example, the fabric casing or cover 114 may include zippers 115 so as expose the inflatable assembly 101 if needed, such as for replacement or repairs as seen in FIG. 2. In another embodiment, the inflatable assembly 101 may include one or more air pouches or bags with a nozzle for insertion of the air or gas. The nozzle may also then be opened or closed to keep the air in the inflatable assembly 101 or out of it for easy storage. With the frame structure 102, the frame structure 103 may expose two large rectangular or surface areas. One area may be to receive the lamp body assembly 102, such as at the bottom of the frame structure 103. The other area may be an open area for the light emitted from the lamp body assembly 102 to be exposed.

In one aspect, the lamp body assembly 102 may be disposed on or connected to one side of the frame structure 103. In one aspect, the lamp body assembly 102 may include an array or a collection of light emitting units on a first side thereof so as to maximize the largest surface area of the inflatable lamp 100. In one aspect, the array or collection of light emitting units may be disposed on a sheet or surface with edges having connecting means to be attached to the frame structure 103. For example, the lamp body assembly 102 may include a sheet or a plate for supporting or holding the light emitting units. In another example, the lamp body assembly 102 may include strips of light emitting units, polyvinyl chloride (PVC) or polycarbonate (PC) reinforcing sheets. The sheet or plate then may be attached to one side of the frame structure 103 and creates a chamber surrounded by the frame structure 103. In one example, the sheet may be a fabric with four edges thereof comprising a zipper. Similarly, the corresponding side of the frame structure 103 may also have a zipper to receive the sheet so that the lamp body assembly 102 may be securely attached to the frame structure 103. By disengaging the lamp body assembly 102 from the frame structure 103, the lamp body assembly 102 may be folded or rolled. Other attachments means may be used, such as buttons, hook-and-loop systems, or the like may be used without departing from the present disclosure. With such construction of the lamp body assembly 102, aspects of the invention improve over the prior art where the light source is separately attached to the middle of the frame structure. In another embodiment, the lamp body assembly 102 may further include an energy connection for receiving electrical energy to energize the light emitting units. As such, the lamp body assembly 102 may be positioned that is parallel to the two rectangular areas of the inflatable lamp 100. With such disposition, the light emitted by the lamp body assembly 102 may be emitted from one end or side of the inflatable lamp 100 through the middle of the frame structure 103, which is a void or an open space. In one aspect, the other of the rectangular areas may be covered by a fabric or diffuser 113 to soften the emitted light.

Applying the air-filled lamp of the above embodiment, the frame structure 103 may include a lampshade or a lamp cover. When in use, the light emitted by the lamp body assembly 102 may be emitted from or directed to the middle of the frame structure 103, which may effectively prevent the light from being distorted, while improving the utilization rate of photoelectric resources. The utility model structure of embodiments of the invention provides elegant construction; it is easy to use; and has good practical value.

In one example, the fabric casing or covering 114 may cover the four sides or exterior surfaces of the frame structure 103.

Understandably, the fabric casing 114 may include zippers 115 on the sides. The fabric casing 114 and the air pouch or bag may be made in a detachable form by arranging the zippers 115, so that the fabric casing may be opened, and the air pouch can be taken out from the fabric casing, which is convenient for replacing the air pouch.

It is to be understood that, the side of the lamp body assembly 102 away from the inflatable assembly 101 is provided with a bracket assembly 104. In one example, the bracket assembly 104 engages with a second side of the lamp body assembly 102.

In some embodiments of the present utility model, the bracket assembly 104 may include a bendable connection or an elbow-shaped pipe 106. In another embodiment, the bendable connection 106 may include a mounting plate, the top of the elbow 106 is provided with a mounting plate 105. In one aspect, the bracket assembly 104 is connected to the lamp body assembly 102 through the mounting plate 105, specifically, the mounting plate 105 and the lamp body assembly 102 may connected via screws, bolts or other locking or securing mechanisms, thus making it easy to assemble and disassemble the lamp body assembly 102.

In one embodiment, the bottom of the bendable connection 106 may include a pipe connecting 107, through which the bracket assembly 104 may be further connected to a support rod for supporting the inflatable lamp 100. For example, the support rod may be a stand or tripod or other device for upholding the inflatable lamp 100.

It may be understood that the bracket assembly 104 is detachably connected to the lamp body assembly 102. The detachable connection between the bracket assembly 104 and the lamp body assembly 102 also may facilitate the storage of the entire inflatable lamp in a non-working or folding state, which is convenient for carrying and transporting.

It may be understood that the lamp body assembly 102 may be provided with a magnet cover 108 corresponding to the installation position of the inflatable assembly 101, and the top of the bracket assembly 104 is provided with the mounting plate 105, and the mounting plate 105 is adapted to the magnet cover 108. In one example, the mounting plate 105 may be of metallic composition. In another embodiment, the mounting plate 105 may include a set of magnets to be attracted by the magnet cover 108. In this embodiment, the lamp body assembly 102 and the bracket component 104 may be secured by magnetic attraction, which is convenient for disassembly and assembly. It is also to be understood that the mounting plate 105 may be replaced by other magnetic objects.

It may be understood that, the magnet cover 108 may be provided with a set of holes or openings, and the bracket assembly 104 is provided with a buckle structure adapted to the holes or openings. It may be understood that the simple magnetic structure may achieve the attachment or fixation of the lamp body assembly 102 and the bracket assembly 104, but such connection may not line up properly. Therefore, in this embodiment, the cooperation between the set of holes and the buckle structure is established, the positions of the lamp body assembly 102 and bracket assembly 104 would not be easily misaligned or displaced under the action of external force.

It may be understood that the inflatable lamp 100 may further include a control unit 109, which may electrically connected to the inflatable light 100 or the lamp body assembly 102. In one example, the control unit 109 may be connected with a wired or a wireless connection. In one aspect, the control unit 109 may supply power to the lamp body assembly 102 and actuate the light of the lamp body assembly 102. In another aspect, the lamp body assembly 102 may include a M16 male connection 110, and the control unit 109 may include a M16 female connection 111. When the M16 male connection 110 and the M16 female connection 111 are connected, the control unit 109 may configure and control power to the inflatable light 100.

In another example, the control unit 109 may adjust the brightness of the lamp body assembly via a brightness adjustment button. For example, the brightness adjustment range may be 0-100%. The control unit 109 may also include a battery pack or a connection to a solar panel for outdoor use.

It may be understood that the inflatable assembly 101 may be connected to an air pump nozzle assembly 112, and the air pump nozzle assembly 112 may be electrically connected to the control unit 109.

It may be understood that the frame structure 103 may include with a diffuser 113 in the light direction of the lamp body assembly 102. The setting of the soft light fabric of the diffuser 113 may enable aspects of the invention to realize the soft light effect, so that the direct light may be diffused, and it is more friendly to human eyes.

Obviously, the above-mentioned embodiments are only examples of the description, and are not intended to limit the implementation manner. For those of ordinary skilled in the art, changes or modifications in other different forms can also be made on the basis of the above description. There is no need and cannot be exhaustive of all implementations here. And the obvious changes or changes derived from this are still within the scope of protection created by the present application.

What is claimed is:

1. An inflatable lamp comprising:
an inflatable assembly, wherein the inflatable assembly comprises a frame structure, and the frame structure is inflatable by air;
wherein the frame structure creates two openings;
a lamp body assembly having a first side with at least one light emitting unit and a second side for connecting with a bracket assembly, wherein the lamp body assembly securing to the frame structure and closing at least a portion of one of the two openings created by the frame structure, wherein light emitted by the lamp body assembly is exposed through the other of the two openings created by the frame structure, wherein the other of the two openings is covered by a diffuser;
wherein the bracket assembly is connected to the second side of the lamp body assembly; and
wherein the lamp body assembly comprises a magnet cover corresponding to an installation position of the inflatable assembly.

2. The inflatable lamp according to claim 1, wherein the inflatable assembly comprises a fabric casing and an air pouch disposed in the frame structure.

3. The inflatable lamp according to claim 2, further comprising a zipper on a side of the fabric casing.

4. The inflatable lamp according to claim 1, further comprising a control unit, wherein the control unit is electrically connected to the lamp body assembly, and the control unit energizes the at least one light emitting unit of the lamp body assembly.

5. The inflatable lamp according to claim 4, wherein the inflatable assembly comprises an air pump nozzle assembly, and the air pump nozzle assembly is electrically connected to the control unit.

6. The inflatable lamp according to claim 1, wherein the bracket assembly is detachably connected to the lamp body assembly.

7. The inflatable lamp according to claim 1, wherein the top of the bracket assembly comprises a mounting plate matching the magnet cover.

8. The inflatable lamp according to claim 1, wherein the frame structure comprises a diffuser in the lighting direction of the lamp body assembly.

9. An inflatable lamp comprising:
an inflatable assembly, wherein the inflatable assembly comprises a frame structure, and the frame structure is inflatable by air;
wherein the frame structure creates two openings;
a lamp body assembly having a first side with at least one light emitting unit and a second side for connecting with a bracket assembly, wherein the lamp body assembly securing to the frame structure, closing at least a portion of one of the two openings created by the frame structure, and creating a chamber surrounded by the frame structure, wherein light emitted by the lamp body assembly is exposed through the other of the two openings created by the frame structure, wherein the other of the two openings is covered by a diffuser;
wherein the bracket assembly is connected to the second side of the lamp body assembly; and wherein the lamp body assembly comprises a magnet cover corresponding to an installation position of the inflatable assembly.

10. The inflatable lamp according to claim 9, wherein the inflatable assembly comprises a fabric casing and an air pouch disposed in the frame structure.

11. The inflatable lamp according to claim 10, further comprising a zipper on a side of the fabric casing.

12. The inflatable lamp according to claim 9, further comprising a control unit, wherein the control unit is electrically connected to the lamp body assembly, and the control unit energizes the at least one light emitting unit of the lamp body assembly.

13. The inflatable lamp according to claim 12, wherein the inflatable assembly comprises an air pump nozzle assembly, and the air pump nozzle assembly is electrically connected to the control unit.

14. The inflatable lamp according to claim 9, wherein the bracket assembly is detachably connected to the lamp body assembly.

15. The inflatable lamp according to claim 9, wherein the top of the bracket assembly comprises a mounting plate matching the magnet cover.

16. The inflatable lamp according to claim 9, wherein the frame structure comprises a diffuser in the lighting direction of the lamp body assembly.

\* \* \* \* \*